(12) United States Patent
Edamadaka et al.

(10) Patent No.: US 8,880,581 B2
(45) Date of Patent: Nov. 4, 2014

(54) SYSTEM AND METHOD FOR CLASSIFICATION OF MEDIA IN VOIP SESSIONS WITH RTP SOURCE PROFILING/TAGGING

(71) Applicant: Avaya Inc., Basking Ridge, NJ (US)

(72) Inventors: Rajeshwari Edamadaka, Allentown, NJ (US); Timothy Ian Ross, Fair Haven, NJ (US); Harsh V. Mendiratta, East Brunswick, NJ (US)

(73) Assignee: Avaya Inc., Basking Ridge, NJ (US)

( * ) Notice: Subject to any disclaimer, the term of this patent is extended or adjusted under 35 U.S.C. 154(b) by 253 days.

(21) Appl. No.: 13/630,972

(22) Filed: Sep. 28, 2012

(65) Prior Publication Data

US 2014/0095576 A1    Apr. 3, 2014

(51) Int. Cl.
*G06F 15/16*    (2006.01)
(52) U.S. Cl.
USPC .......................................... 709/202; 709/227

(58) Field of Classification Search
USPC ................... 709/202, 224, 227, 200
See application file for complete search history.

(56) References Cited

U.S. PATENT DOCUMENTS

2010/0103818 A1*  4/2010  Griffith et al. ................ 370/235

* cited by examiner

*Primary Examiner* — El Hadji Sall
(74) *Attorney, Agent, or Firm* — Maldjian Law Group LLC; John Maldjian; Alexander D. Walter

(57) ABSTRACT

System and method to perform a directive by a first SIP User Agent (UA) engaged in a peer-to-peer communication session with a second SIP User Agent (UA), the method including: arming the first SIP User Agent (UA) to define the directive; setting a trigger condition in the first SIP User Agent (UA) to perform the directive if the trigger condition becomes true; monitoring, by use of a processor within the first SIP User Agent (UA), for the trigger condition in the communication session; and if the trigger condition becomes true, performing by use of a processor the directive without usage of a back-to-back user agent.

23 Claims, 3 Drawing Sheets

SYSTEM AND METHOD FOR CLASSIFICATION OF MEDIA IN VOIP SESSIONS WITH RTP SOURCE PROFILING/TAGGING

BACKGROUND

1. Field of the Invention

Embodiments of the present invention generally relate to peer-to-peer SIP communications, and, in particular, to a system and method for replacing back-to-back user agents with armed rich endpoint directives.

2. Description of Related Art

The infrastructure for Session Initiation Protocol ("SIP") currently requires applications that handle calls to monitor and receive messages in a signaling path to an endpoint. Such an application may be referred to as an in-sequence application. A SIP-compatible in-sequence application is usually implemented as a back-to-back user agent ("B2BUA") in order to provide various services. Currently, such applications must remain in the core signaling path of the call and continuously monitor for certain conditions that must be intercepted.

Furthermore, providing SIP-compatible features executing in the network core involves extensive effort and time in order to create and develop centralized core applications, thereby slowing down the pace of deployment and availability of such features to the customer. Core SIP applications also increase feature and signaling complexity by breaking a peer-to-peer nature of the call flows. In-sequence applications, which currently need to be present in order to monitor the call signaling are difficult to develop, are large and resource-intensive when they run, expensive, and are hard to scale centralized applications. The in-sequence applications cause most or all of the communication traffic to traverse through the back to back application, potentially causing latency problems.

Furthermore, having too many in-sequence applications slows down the call transmission.

SIP back-to-back applications are prone to breaking features (i.e., causing features to fail) if they are not properly designed, including that of properly forwarding the call signaling as the call passes through the B2BUA.

Even with the advent of smarter endpoints in SIP, there are still a large number of scenarios that currently require a back to back application resource to perform actions when certain conditions are met. For example, in the case of a post-call survey, an application must currently monitor a call path, ahead of an endpoint in a processing sequence, and monitor for an indication that the call is disconnected. Upon end of the call, the call is intercepted before it can be disconnected. Instead of allowing the call to be disconnected, the application then transfers the call to a survey Interactive Voice Response announcement.

Additional examples of core SIP features that currently require a B2B are: (1) recording a call; (2) invoking certain features such as limiting call duration, limiting billing applications, etc.; and (3) call preservation.

Methods of the related art may use configuration settings or administration settings to provide a limited level of customization or control. However, such settings are too static and do not provide the necessary dynamic control needed so that features can be invoked at any time.

Methods of the related art may use feature Uniform Resource Names ("URNs"), which may be triggered by an application that is constantly monitoring the SIP signaling and media and, when invoked, the application provides an immediate action. URNs are described more fully in RFC-5031. A drawback of this method is that it is a service that needs to be invoked right away, and hence does not include a way to delegate the monitoring of a condition to an endpoint. Furthermore, monitoring media by an application is expensive and impractical, especially when scaled to large volume of concurrent calls.

Methods of the related art may use monitoring applications that are not in sequence (i.e., not constantly monitoring the SIP signaling). However, a drawback of such a method is that such monitoring applications are limited in their control. For example, such monitoring applications are unable to be in a media path and therefore are unable to watch for media-related triggers.

SUMMARY

Embodiments in accordance with the present invention provide a method of arming SIP User Agents (including endpoints and/or applications) ahead of time by use of SIP messaging to transmit a Rich endpoint directive, for example by using a Refer message, or by using an Out-of-Dialog ("OOD") Refer ("OOD-R") message, or by using point-to-point ("P2P") messages such as INFO or MESSAGE. The Rich endpoint directive may also be sent within a REFER message within a dialogue, in which case the Application is itself a first party in the call, rather than being a third party monitoring the call. The endpoints can independently perform a predetermined operation when a particular condition is met, without needing an application resource provided by a back-to-back UA. The Rich endpoint directive enables remote applications (i.e., an application running at a SIP User Agent (UA)) to establish calls by, e.g., sending a SIP REFER message without using an initial SIP INVITE. Embodiments in accordance with the present invention are able to set up a call without the endpoint necessarily contacting a third party. An OOD-Refer message may be sent by a network application that is not currently in a dialogue or conversation with the endpoint, such that the triggering condition and action are completely contained inside the SIP OOD-Refer message, and the endpoint may be sufficiently self sufficient to execute the OOD-Refer message. The resulting action may or may not involve a third party, depending upon the nature of the action. For example, the action may be to transfer a call to survey IVR, or it could be to hang up the call, or play a tone, or detect a speech pattern etc. The SIP REFER method is described more fully in RFC-3515, which is incorporated herein in its entirety.

Embodiments in accordance with the present invention include increased intelligence in SIP User Agents, allowing the SIP User Agents to receive and process a directive ahead of time that the SIP User Agents may perform when a certain condition is met, without being under the control of a SIP core application. This allows for a distributed intelligence using the deployed intelligent endpoints that are SIP User Agents (UA). Thus, within enterprises where the intelligent endpoints (SIP UA) are deployed, features offered by applications executing at the intelligent endpoints (SIP UA) may be provided without needing to use applications executing at a SIP back-to-back UA.

When a client transmits a SIP Register message, it includes its User Agent capabilities in the SIP Register message per RFC 3840 and also indicates that it is capable of receiving and acting on rich armed endpoint directives. If an endpoint is unable to handle the directive, then the SIP UA can advise the user that a rich endpoint (i.e., a SIP UA that has the armed rich endpoint capability) could be helpful here. Alternatively, a logical enhancement element may be inserted in front of certain SIP User Agent (UA)s that are less feature-capable. The logical enhancement element interprets the armed rich endpoint directives and implements its features in the less feature-capable SIP elements. So with a combination of the logical enhancement element in front of the less feature-capable SIP User Agent (UA), the combination can transform the less feature-capable SIP User Agent (UA) into a rich armed endpoint directive capable device, in order to provide new features. However for intelligent endpoints (SIP UA), providing a suitably configured proxy application is sufficient to arm the endpoints (SIP UAs).

Embodiments in accordance with the present invention are more scalable as the number of SIP User Agent (UA)s increases, while providing substantially the same feature capabilities as that provided by a SIP back-to-back UA.

Embodiments in accordance with the present invention provide a system and method to perform a directive by a first SIP User Agent (UA) engaged in a peer-to-peer communication session with a second SIP User Agent (UA), the method including: arming the first SIP User Agent (UA) to define the directive; setting a trigger condition in the first SIP User Agent (UA) to perform the directive if the trigger condition becomes true; monitoring, by use of a processor within the first SIP User Agent (UA), for the trigger condition in the communication session; and if the trigger condition becomes true, performing by use of a processor the directive without usage of a back-to-back user agent.

The Armed Rich endpoint directive handles a deferred, a future and/or a conditional action that needs to be taken and when a condition is satisfied, and the action itself can be a URN action as described in RFC5031.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
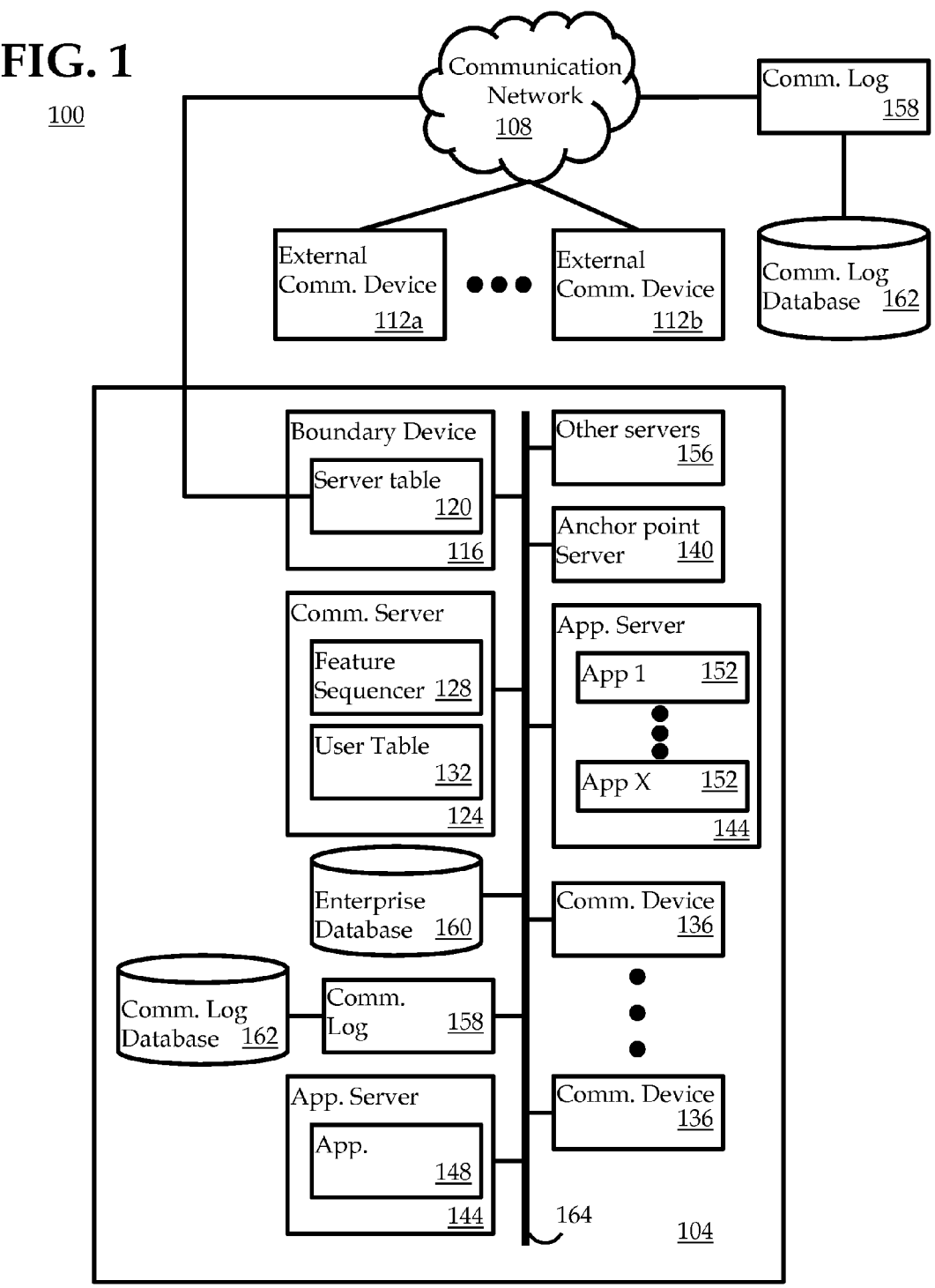
FIG. 1 is a block diagram depicting a communication system in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize applications in a peer-to-peer network rather than communicating through a central point such as a B2BUA.

The exemplary systems and methods of this disclosure will also be described in relation to software, modules, and associated computing hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

The terms "switch," "server," "contact center server," or "contact center computer server" as used herein should be understood to include a Private Branch Exchange ("PBX"), an Automated Contact Distribution ("ACD") system, an enterprise switch, or other type of telecommunications system switch or server, as well as other types of processor-based communication control devices such as, but not limited to, media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting an electrical signal.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

One or more embodiments of the present invention may utilize Session Initiation Protocol (SIP) as a communication protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communication sessions. Examples of the types of communication sessions that may be established using SIP include voice, video, and/or instant messaging. SIP also facilitates peer-to-peer communication sessions. These communication sessions may be carried out on any type of communication device such as a personal computer, laptop computer, Personal Digital Assistant, telephone, mobile phone, cellular phone, or the like. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices or endpoints, also referred to as User Agents (UAs) without having to know each of the unique device addresses or phone numbers.

Users or any other addressable entities in a SIP framework are identified by Universal Resource Identifiers (URI). Each such Internet-style address (for example, sip:johndoe@avaya.com) maps into one or more Contacts, each of which typically represents a device or service at which the corresponding user may be reached. Examples are phones, desktop multimedia clients, instant message accounts, email accounts and so on. The SIP framework is responsible for routing a request for a peer-to-peer session addressed to a given URL to one or more appropriate contacts for that URL. The framework may utilize information about the preferences, presence and location of the user identified by the URL, to determine the most appropriate contacts. The protocol also provides mechanisms to specify the type of session that is requested as well as means to change session parameters.

SIP is not a vertically integrated communications system. SIP is rather a component that can be used with other IETF protocols to build a complete multimedia architecture. Typically, these architectures will include protocols such as RTP (RFC 3550) for transporting real-time data and providing QoS feedback, the Real-Time streaming protocol (RTSP) (RFC 2326) for controlling delivery of streaming media, the Media Gateway Control Protocol (MEGACO) (RFC 3015) for controlling gateways to the Public Switched Telephone Network (PSTN), and the Session Description Protocol (SDP) (RFC 2327) for describing multimedia sessions. Therefore, SIP should be used in conjunction with other protocols in order to provide complete services to the users. However, the basic functionality and operation of SIP does not depend on any of these protocols.

FIG. 1 depicts a communication system 100 according to an embodiment of the present disclosure. The communication system 100 may include an enterprise network 104 that is in communication, via a (typically untrusted or unsecure or public) communication network 108, with one or more external communication devices 112a and/or 112b (collectively, 112). The external communication devices 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, laptops, Personal Computers (PCs), Personal Digital Assistants (PDAs), digital phones, analog phones, and the like.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The enterprise network 104 may include a boundary device 116 including a server table 120, a communication server 124 including a call feature sequencer 128 and a user table 132, one or more internal communication devices 136, an anchor point server 140, one or more application servers 144 which may be capable of providing one application 148 or a set of different applications 152, a number of other servers 156, and an enterprise database 160, all of which are interconnected by a (trusted or secure or private) Local Area Network (LAN) 164. Some or all of the functions depicted in FIG. 1 may be co-hosted and/or co-resident on a single server. The depiction of components in FIG. 1 is generally intended to be a logical depiction of the components of the system 100.

The LAN 164 can be secured from intrusion by untrusted parties by a gateway and/or firewall located between the LAN 164 and communication network 108. In some embodiments the boundary device 116 may include the functionality of the gateway and/or firewall. In some embodiments, a separate gateway or firewall may be provided between the boundary device 116 and the communication network 108.

The communications server 124 can include a Private Branch eXchange (PBX), an enterprise switch, an enterprise server, combinations thereof, or other type of telecommunications system switch or server. The communication server 124 is preferably configured to execute telecommunication functions such as the suite of or Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof. Embodiments herein may refer to communication server 124 generically as a "session manager" for ease of reference.

Although only a single communications server 124 is depicted in FIG. 1, two or more communications servers 124 may be provided in a single enterprise network 104 or across multiple separate LANs 164 owned and operated by a single enterprise, but separated by a communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and services a first subset of enterprise users whereas a second communications server 124 may be authoritative for and services a second subset of enterprise users, where the first and second subsets of users generally do not share a common user. This is one reason why the network boundary device 116 may be provided with a server table 120.

Additionally, multiple servers 124 can support a common user community. For example, in geo-redundant configurations and other applications where users aren't necessarily bound to a single application server, there may be a cluster of equivalent servers where a user can be serviced by any server in the cluster.

In accordance with at least some embodiments of the present invention, the mapping of user identities within a communication request does not necessarily have to occur at the network boundary device 116. For instance, the mapping between an authoritative server and a user may occur "behind" the network boundary device 116 within the enterprise network 104.

In some embodiments, network boundary device 116 is responsible for initially routing communications within the enterprise network 104 to the communications server 124 responsible for servicing a particular user involved in the communication. For example, if a first enterprise user is being called by an external communication device 112, then the network boundary device 116 may initially receive the inbound call, determine that the call is directed toward the first enterprise user, reference the server table 120 to identify the authoritative communications server 124 for the first enterprise user, and route the inbound call to the authoritative communications server 124. Likewise, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but it is not necessarily required that the server be the same. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by the communication network 108.

Each communications server 124 includes a feature sequencer 128 and a user table 132. The user table 132 for a communications server 124 contains the communication preferences for each user for which it is authoritative. In particular, the user table 132 may be provisioned by users and/or by administrative personnel. The communications preferences for a particular user are referenced by the feature sequencer 128 to determine which, if any, features should be incorporated into a communication session for the user. The feature sequencer 128 can actually provide communication features directly into the communication session or the feature sequencer 128 can determine an application sequence which will be invoked during set-up and used during the communication session.

In accordance with at least some embodiments, the feature sequencer 128 can determine an application sequence and cause one or more applications 148, 152 to be sequenced into a communication session. In particular, the feature sequencer 128 is configured to analyze a particular user's communication preferences and invoke the necessary applications to fulfill such preferences. Once an application sequence is determined by the feature sequencer 128, the communications server 124 passes the communication-establishing message to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the feature sequencer 128 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, the process continues until all applications have been included in the communication session and the process can be duplicated for each of the users involved in the communication session.

Although only two application servers 144 are depicted, one skilled in the art will appreciate the one, two, three, or more applications servers 144 can be provided and each server may be configured to provide one or more applications. The applications provided by a particular application server 144 may vary depending upon the capabilities of the server 144 and in the event that a particular application server 144 comprises a set of applications 152, one, some, or all of the applications in that set of applications 152 may be included in a particular application sequence. There is no requirement, however, that all applications in a set of applications 152 be included in an application sequence and there is no requirement as to the order in which applications are included in the application sequence. Rather, the application sequence is usually determined based on a user's communication preferences, which can be found in the user table 132. Alternatively, or in addition, the applications that appear in a users sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences defining preferred media types and rules for converting communication sessions from one media type to another different media type. Still further, a user may have preferences defining the manner in which multi-media communications are established and conducted.

The applications included in a particular application sequence are generally included to accommodate the user's preferences. Applications may vary according to media-type, function, and the like. Exemplary types of applications include, without limitation, an EC-500 (extension to cellular) application, a call setup application, a voicemail application, an email application, a voice application, a video application, a text application, a conferencing application, a call recording application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

Figure 2:
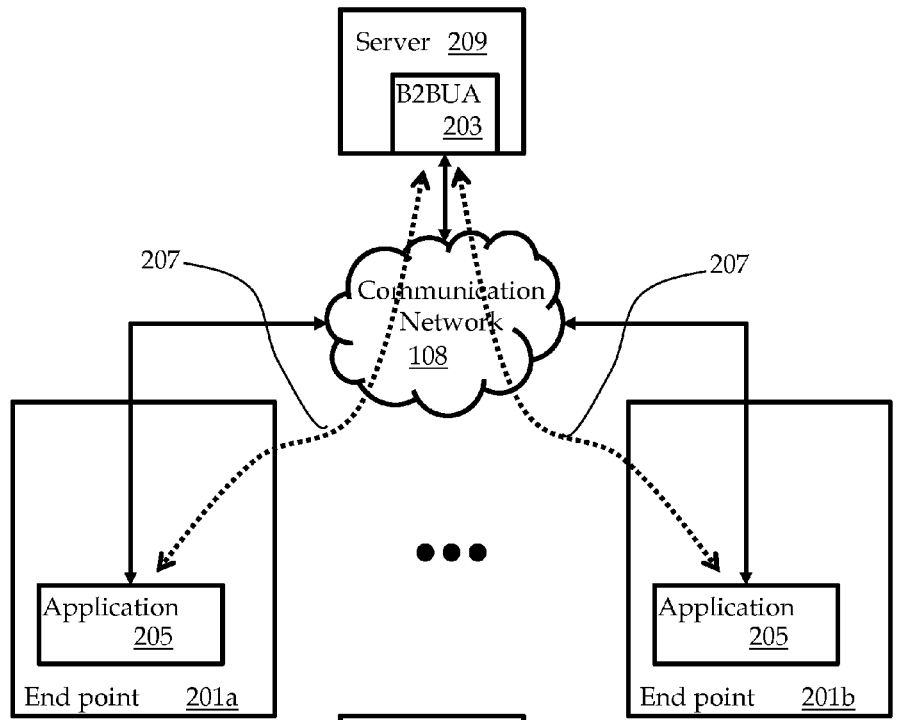
FIG. 2 illustrates at a high level of abstraction a communication flow.
Figure 3:
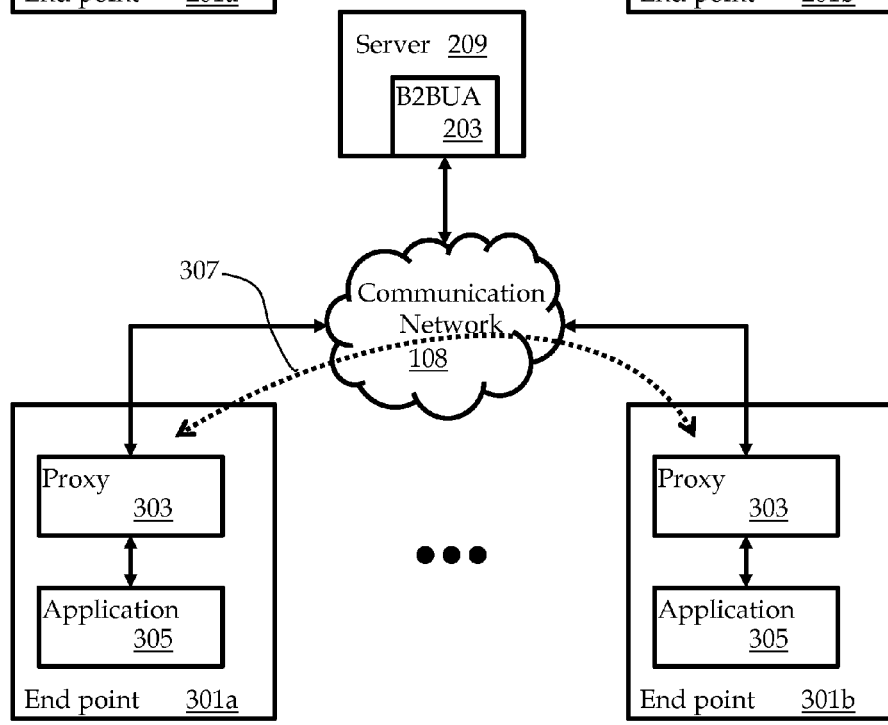
FIG. 3 illustrates at a high level of abstraction a communication flow in accordance with an embodiment of the present invention.

FIG. 2 illustrates at a high level of abstraction a communication system 200 using a SIP core application, as known in the background art. System 200 includes external communication devices 201a, 201b (collectively, 201) (i.e., endpoints or SIP UAs). Endpoints 201 may be substantially similar to external communication devices 112 illustrated in FIG. 1. Each endpoint 201 includes an application program 205 that desires to communicate with another application program 205 in another endpoint 201, via communication network 108. A SIP B2BUA 203 is included in the core network, and may be implemented as a module of server 209. Server 209 may be substantially similar to server 144 of FIG. 1. A communication flow 207 to and from the endpoints 201a, 201b passes through B2BUA 203 in order to provide a desired feature such as a invoking a survey, wiretapping, billing, time limits, and so forth FIG. 3 illustrates at a high level of abstraction a communication system 300 without using a SIP core application for communication between at least some endpoints (SIP UAs), in accordance with an embodiment of the present invention. System 300 includes external communication devices 301a, 301b (collectively, 301) (i.e., endpoints). Each endpoint 301 includes an application program 305 that desires to communicate with another application program 305 in another endpoint 301, via communication network 108. Each endpoint 301 also includes a proxy 303, which may be configurable to replicate one or more functions of B2BUA 203 (e.g., invoking a survey, wiretapping, billing, time limits, and so forth). A communication flow 307 to and from the endpoints 301a, 301b passes through communication network 108 in a peer-to-peer manner without involvement by B2BUA 203.

Embodiments in accordance with the present invention provide a method and command syntax of the SIP OOD Refer message that may be used to arm and trigger the SIP User Agent (UA). The command syntax includes: (1) an action that should be taken when the trigger is invoked (i.e., arming the SIP User Agent (UA)); and (2) a condition that triggers the armed SIP User Agent (UA) (i.e., a triggering condition). The triggering condition will produce a Boolean result, i.e., either the triggering condition occurred or it has not occurred. When the Boolean result is TRUE, then the action will be taken.

Figure 4:
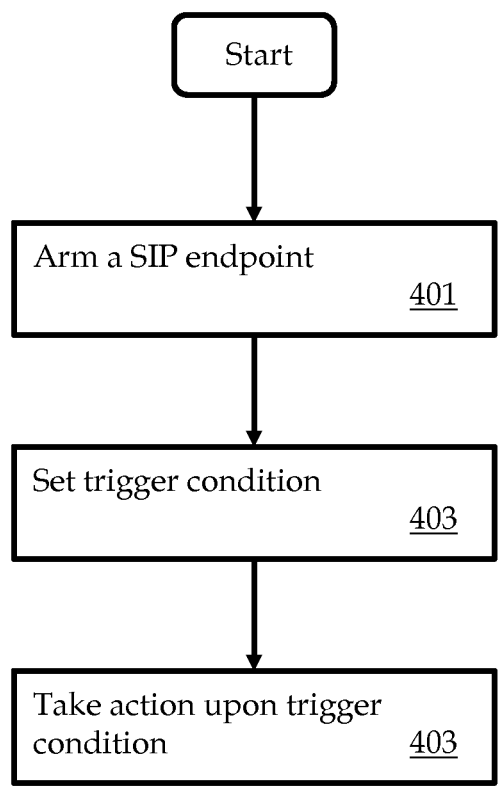
FIG. 4 illustrates a method in accordance with an embodiment of the present invention.

FIG. 4 illustrates at a high level of abstraction a method 400, in accordance with an embodiment of the invention. It will be understood by persons of skill in the art that certain steps may be performed in a different order than depicted, or be performed in parallel.

Method 400 begins at step 401, at which embodiments in accordance with the present invention arm a SIP User Agent (UA) ahead of time with a directive that should be performed when a predetermined triggering condition or event (generically, "trigger condition") occurs. The arming may be accomplished by way of an OOD-R message, which allows remote applications to establish calls by sending a REFER message to a session manager without an initial INVITE. After the REFER is sent, the remainder of the call setup may be independent of the application, and the media stream does not flow through the remote application. The remote application using OOD-R triggers a call setup request that specifies the Referee address in the Request-URI and the Refer-Target in the Refer-To header. The SIP messaging used to communicate with the session manager may be independent of the end-user device protocol which may include SIP, Skinny Call Control Protocol ("SCCP"), H.323, or plain old telephone service ("POTS") or any other protocol.

Next, at step 403, a trigger condition is set. The trigger condition may include one or more trigger categories or scenarios such as occurrence of a predetermined signaling condition, occurrence of a predetermined media content, occurrence of a billing condition, occurrence of time-based criteria, and so forth. Examples of trigger conditions may include:

Certain user actions that help to start and end a call at the SIP User Agent (UA) may provide a trigger condition, e.g., making a call; hanging up a call;

Device actions such as pressing a DTMF digit, e.g., pressing buttons for contacts etc.;

Media Content related events: detection of predetermined media content (e.g., upon words, phrases, sentences, audible commands, etc. recognized in voice-recognized speech); detection of a characteristic of the media content (e.g., language being spoken, gender of speaker, video quality, connection speed, connection quality, etc.); detection of certain media content (e.g., if "on hold" music is detected, or if DTMF tones are detected, or if speech signals are being recognized and/or transcribed and certain content is detected in the recognized speech, recognizing verbal outbursts, increasing pitch etc., and so forth).

Managing call related actions, i.e., actions that can be performed upon a connected call after the call has been initiated. For example, transfer of a call; actions related to managing a conference call; placing a call on hold; picking up a call that was on hold; placing a call; answering a call; clearing a connection (i.e., hanging up); deflecting call (i.e., forwarding a ringing call as opposed to transferring an answered call); placing a call on hold; picking up a call that was on hold; single step transferring (i.e., a blind transfer) of a call to another number; splitting a call to another number; occurrence of predetermined SIP messages; etc.

Certain time-based criteria may provide a trigger conditions, e.g., at a fixed time such as 6:00 am., or at a predetermined time interval after setting the trigger, e.g., one minute, one hour, 24 hours, etc. after setting the trigger.

Certain time-based criteria may be combined or coupled with a state of the call in order to provide a triggering condition, e.g., if a call has been on hold for five minutes then a first triggering condition may be set; or if a call has been going on for 30 minutes then a second triggering condition may be set; and so forth.

Invoking certain features may provide a triggering condition, e.g., if an On Feature URN is detected (such as OOD Refer of PBX Feature). Examples of this include a B2B application server sending a third party call control command to do PBX features like conference, consultation transfer, etc. These are done through an OOD Refer message being sent by a PBX to the SIP User Agent (UA) via methods described in RFC5031 or vendor-specific headers in an OOD-Refer Message. In some embodiments, an SIP User Agent (UA) itself performs these steps as first party call control/features. In other embodiments, an SIP User Agent (UA) may receive third party call control directives. The Armed Rich Endpoint (SIP UA) can be set to trigger on receipt of such third party call control OOD Refer messages from another B2B server (typically a PBX).

Certain messaging or control portions of messages may provide a triggering condition, e.g., when a SIP message having a predetermined header type is observed (e.g., SIP Method, Request URI, CallID, etc.); direction (i.e., an indicator to indicate whether the endpoint (SIP UA) is receiving a call or making a call); contains (i.e., whenever a SIP message that contains a certain predetermined header or parameter has been received by the endpoint (SIP UA)); when the payload of the SIP message equals a predetermined value; upon a feature URN that includes OOD Refers (in order to prevent recursion); upon detection of some predetermined user action (e.g., when a user transfers the call by use of a SIP request, e.g., a SIP REFER message); upon detection of some predetermined media content; upon detection of the start or end of a media stream; upon detection of certain predetermined phonemes and/or words spoken; and so forth.

Other actions or conditions similar in nature but not specifically listed above.

If the trigger condition include occurrence of a feature URN that includes OOD Refers, a possibility exists of recursive referrals, e.g., if endpoint (SIP UA) "A" refers to endpoint (SIP UA) "B", and in turn endpoint (SIP UA) "B" refers to endpoint (SIP UA) "A". Such a situation may be handled by limiting the endpoint (SIP UA) directive to at most just one referral, or assigning a lower priority to second and subsequent referrals between the same pair of endpoint (SIP UA)s. The priority of endpoint directive will be communicated to endpoint (SIP UA) using the EDRequestPriority message as described below. This may be done by another proxy arbitrator app, or by a proxy or by the endpoint (SIP UA) itself. The endpoint (SIP UA) may need arbitration and a method to detect and to halt recursive actions for its own safety. It should be understood that resolving conflict and preventing infinite loop traversal is a flexible process that may be achieved in a variety of ways that differ in process options, order of performing steps, and so forth. An exemplary method is presented below, but embodiments in accordance with the present invention are not limited to options such as those suggested below. The first EDR request may have an exemplary format such as:

---

Refer sip:a@avaya.com
...
ON <Event=SIP_Method:INVITE;dir=incoming> and <SIP_From=b@avaya.com>;
EDRequestor: edrapp@domain.com
EDRequestId: 123
EDRequestPriority=1 (inserted by Proxy App and agreed upon by SM?)

---

The second EDR request may have a format such as:

---

Refer sip:a@avaya.com
...
ON <Event=SIP_Method:INVITE;dir=outgoing> and <SIP_From=c@avaya.com>;
EDRequestor: edrapp@domain.com
EDRequestId: 123
EDRequestPriority=9 (lower priority) (inserted by Proxy App)

---

The value of the EDRequestPriority parameter in the second EDR request will be a number that is greater than the value of the EDRequestPriority parameter in the first EDR request.

A rich SIP User Agent will confirm and acknowledge the directive by sending a 200 OK response to an Armed Directive Requestor (or a Proxy application). There may be an implicit trust relationship between the Requestor and the SIP User Agent, such that the SIP User Agent will act on armed directive. There may be a mechanism between the Requestor and the SIP UA to prevent tampering of the trust (e.g., Avaya certification, binary checksum of SIP UA software, etc.). The mechanism may be included at the time of sending a REGISTER message, thus indicating to a proxy app that such an endpoint (SIP UA) has not been tampered with, and that the response of 200 OK from the endpoint (SIP UA) may be relied upon as a guarantee to act on armed directive.

Next, at step 405, the action that the SIP User Agent (UA) should take when the triggering condition occurs may be specified. Step 405 differs from step 401 at least because arming at step 401 is a step during which a proxy app informs a client to watch for a predetermined condition, and specifies in advance the action that the client needs to take. In contrast, step 405 is a step during which the client in fact executes the action. In particular, embodiments in accordance with the present invention may provide one or more of the following actions that should be taken when a triggering condition is detected: an action that can be referred to by an OOD Refer request URI; specific primitives whose presence may be monitored for, e.g., new primitives, customized primitives, primitives for a particular function such as speech mining detection; show IP Terminal Markup Language ("IPTML") ("show IPTML"), which refers to a custom XML method to show menus on the client's displays where a user can select any of the presented choices and the selection will be executed locally on client or on a remote server; local call and/or media connection information preservation, e.g., media tap for law enforcement purposes; and so forth. The actions so taken are extensible in order to allow future action types. However, the actions so taken should not become a way to perform dialog state events or well known SIP events, in order not to duplicate those well-established events unless described otherwise herein.

An example of messages in accordance with an embodiment of the present invention, sent to an endpoint (SIP UA) in order to arm the endpoint (SIP UA) and trigger an action when a future condition expressed by new header EDRequest ("Endpoint Directive Request") is satisfied, are listed below. EDRequest is a mechanism to allow the arming application to express a condition on which to trigger the action. EDRequest may be added to an OOD Refer, or an INVITE, or MESSAGE, or INFO SIP messages, being sent to the endpoint (SIP UA). The syntax of EDRequest is:

---

| | | | |
|---|---|---|---|
| i. | Header name is EDRequest | | |
| ii. | Value of header must contain "on condition" | | |
| iii. | Condition can be one or more conditions with logical operators (and, or, not, equals) | | |
| iv. | Condition can be | | |
| v. | - Date = date and time when reached (Absolute Time) | | |
| | 1. The Date header field reflects the time when the request or response was first sent. | | |
| | 2. Its syntax is defined in RFC 3261 and RFC 2616 section 14.18 as follows: | | |
| | 3. Date | = | "Date" HCOLON SIP-date |
| | 4. SIP-date | = | rfc1123-date |
| | 5. rfc1123-date | = | wkday "," SP date1 SP time SP "GMT" |
| | 6. date1 | = | 2DIGIT SP month SP 4DIGIT |

|      |       |   |                                    |
|------|-------|---|------------------------------------|
| 7.   |       |   | ; day month year (e.g., 02 Jun 1982) |
| 8.   | time  | = | 2DIGIT ":" 2DIGIT ":" 2DIGIT       |
| 9.   |       |   | ; 00:00:00 - 23:59:59              |
| 10.  | wkday | = | "Mon" / "Tue" / "Wed"              |
| 11.  |       |   | / "Thu" / "Fri" / "Sat" / "Sun"    |
| 12.  | month | = | "Jan" / "Feb" / "Mar" / "Apr"      |
| 13.  |       |   | / "May" / "Jun" / "Jul" / "Aug"    |
| 14.  |       |   | / "Sep" / "Oct" / "Nov" / "Dec"    |
| vi.  | - After Time interval zz msec has passed |||
| vii. | - On SIP Header (SIP Method, Request URI, CallID) |||
| viii.| - Direction |||
| ix.  | - Contains |||
| x.   | - Equals |||
| xi.  | - On Feature urn incl OOD Refers |||
| xii. | - On endpoint user action |||
| xiii.| - On media content |||
| xiv. | - incl media start/end, or phonemes/words spoken |||

An example of EDRequest is:

```
EDRequest: ON Event=SIP_Method:BYE and SIP_CallId= 222 (==>
new Header)
EDRequestor: edrapp@domain.com (==> new Header)
EDRequestId: 123(==> new Header)
EDRequestPriority=1 (inserted by Proxy App and agreed upon by
SM)(==> new Header)
Header on any sip message ;ON Event=SIP_Method:BYE and
SIP_CallId= 222 (==> new Header)
EDRequestor: edrapp@domain.com (==> new Header)
EDRequestId: 123(==> new Header)
EDRequestPriority=1 (inserted by Proxy App and agreed upon by
SM)(==> new Header)
```

An example of usage of EDRequest is to ask SIP UA B@whatever.com to make a call to A@whatever.com, 30 minutes from now, as shown below:

```
REFER sip:B@whatever.comSIP/2.0
Via: SIP/2.0/UDP
192.168.1.1:12005;branch=z9hG4bK-d87543-2675d;rport
Max-Forwards: 70
Contact: <sip:application@whatever.com:12005>
To: <sip:B at whatever.com>
From: <sip:application@whatever.com>;tag=613cfe4d
Call-ID: a214850dd31f6061 at
bWFycy51cHN0cmVhbS53cm9ja3MuY29t
CSeq: 1 REFER
Allow: INVITE, ACK, CANCEL, OPTIONS, BYE, NOTIFY
Date: Thu, 01 Dec 2005 21:11:22 GMT
Refer-To: <sip:A@whatever.com>
Referred-By : <sip:application@whatever.com>
Content-Length: 0
EDRequest: ON Event=Interval:30 minutes(==> new Header)
EDRequestor: application@whatever.com (==> new Header)
EDRequestId: 123(==> new Header)
EDRequestPriority=1 (inserted by Proxy App and agreed upon by proxy
    arbitrator)(==> new Header)
OOD Refer, Refer RFC3261-requestURI
Here RFC3261-request URI is the action which is to transfer the call to
    c@whatever.com, when a call with CallId=222 ends or hangs up)
REFER sip:B@whatever.comSIP/2.0
Via: SIP/2.0/UDP
192.168.1.1:12005;branch=z9hG4bK-d87543-2675d;rport
Max-Forwards: 70
Contact: <sip:A at 192.168.1.1:12005>
To: <sip:B at whatever.com>
From: <sip:A at whatever.com>;tag=613cfe4d
Call-ID: a214850dd31f6061 at
bWFycy51cHN0cmVhbS53cm9ja3MuY29t
CSeq: 1 REFER
Allow: INVITE, ACK, CANCEL, OPTIONS, BYE, NOTIFY
Date: Thu, 01 Dec 2005 21:11:22 GMT
Refer-To: <sip:C at whatever.com>
Referred-By: <sip:A at whatever.com>
Content-Length: 0
EDRequest: ON Event=SIP_Method:BYE and SIP_CallId= 222 (==>
new Header)
EDRequestor: edrapp@whatever.com (==> new Header)
EDRequestId: 123(==> new Header)
EDRequestPriority=1 (inserted by Proxy App and agreed upon by
    SM)(==> new Header)
OOD Refer, Refer RF3261-requestURI
REFER sip:B at whatever.com SIP/2.0
Via: SIP/2.0/UDP
192.168.1.1:12005;branch=z9hG4bK-d87543-2675d;rport
Max-Forwards: 70
Contact: <sip:A at 192.168.1.1:12005>
To: <sip:B at whatever.com>
From: <sip:A at whatever.com>;tag=613cfe4d
Call-ID: a214850dd31f6061 at
bWFycy51cHN0cmVhbS53cm9ja3MuY29t
CSeq: 1 REFER
Allow: INVITE, ACK, CANCEL, OPTIONS, BYE, NOTIFY
Date: Thu, 01 Dec 2005 21:11:22 GMT
Refer-To: <sip:C at whatever.com>
Referred-By: <sip:A at whatever.com>
Content-Length: 0
EDRequest: ON Event=SIP_Method:BYE and SIP_CallId= 222 (==>
new Header)
EDRequestor: edrapp@domain.com (==> new Header)
EDRequestId: 123(==> new Header)
EDRequestPriority=1 (inserted by Proxy App and agreed upon by
    SM)(==> new Header)
```

An example in accordance with an embodiment of the present invention, of triggering the endpoint (SIP UA) for a billing application to take action when a predetermined amount of time (e.g., 2 minutes) remains on a calling card, is presented below:

```
ON <Event=Interval:120sec> and <SIP_CallId= 222>;
ACTION=req_URI in OOD Refer (transfer to Ann. UA)
```

An example in accordance with an embodiment of the present invention, of invoking a survey (e.g., a customer satisfaction survey) upon completion of a call, is presented below:

```
ON <Event=SIP_Method:BYE; Intercept= true; dir=bi> and
    <SIP_CallId= 222>;
ACTION=req_URI in OOD Refer (transfer to IVR UA)
```

An example in accordance with an embodiment of the present invention, of starting a recording application in order to support a valid request under the Communication Assistance for Law Enforcement Act ("CALEA") (i.e., a wiretap), is presented below. The recording may be done by an Endpoint or a SIP User Agent. In this example, although the 200 OK SIP message can have many meanings, it will be used here to indicate when an RTP link is established or when signaling starts. To record only particular SIP INVITE messages, a particular request URI-contains condition should be specified.

```
ON <Event=SIP_Method:INVITE;dir=bi> and <Req-URI-
    contains=sip:tiross@avaya.com>;
ACTION=local:record or local:media tap..
```

Embodiments in accordance with the present invention may also send media to other focus, e.g., a conference focus or conference server. In such cases the endpoint (SIP UA) will be establishing the media path to a conference bridge instead of to the caller and then the conference server will do the recording. This is done usually by sending a REINVITE to the endpoint (SIP UA) and pointing the media source to be the conference server and indicating that the conference server is the new focus (i.e., the place where call media is mixed, or recorded, etc.) This may be accomplished either by use of an action tag such as ACTION=local:record, or may be included in a request URI. For example, suppose Endpoint (SIP UA) A calls Endpoint (SIP UA) B, Application secures the focus address (AOR of conferencing/recording server) sends a new OOD Refer to both A and Endpoint (SIP UA) B with target dialog=dialogIdfor A's call to B; and Refer-To header=conference focus AOR; isfocus).

An example in accordance with an embodiment of the present invention, of a user action at an endpoint (SIP UA), and in particular of a call from a user being transferred to a special customer service if the hold time exceeds 10 minutes, is presented below:

```
ON <Event=Phone_UserAction:hold;dir=out> and
<Event=Interval:600sec>;
ACTION=req_URI in OOD Refer (transfer caller to premium customer service)
```

An example in accordance with an embodiment of the present invention, of invoking a recording application when certain speech is detected (e.g., if the agent violates policy), is presented below:

```
ON <Event=MEDIA_speechdetect:"!@#$";dir=bi> ;
ACTION=req_URI in OOD Refer (transfer to Sup)
```

An example in accordance with an embodiment of the present invention, of invoking an application to enable easier call preservation, is presented below:

```
ON <Event=SIP_Method:4xx;dir=bi> and
<Event=SIP_Method:5xx;dir=bi> and
<Event=SIP_Method:6xx;dir=bi> ;
ACTION=req_URI in OOD Refer (place invite again to far end)
```

Advantages of embodiments in accordance with the present invention, and differences of between embodiments and previous solutions include one or more of the following:

First, resource-intensive applications now implemented in the core may instead be implemented as simple proxies in the SIP User Agent (UA), or as monitoring applications in the SIP User Agent (UA).

Second, back-to-back UAs are not required for the exemplary usages described above. Advantages that flow from eliminating a need for a B2BUA include, for example:

(a) There is no need for a centralized application to monitor the call continuously for certain conditions that need to be intercepted.

(b) Development of an application for a proxy at an endpoint (SIP UA) is relatively inexpensive compared to the development of an application for a B2BUA.

(c) Applications are more scalable since embodiments distribute the resource-usage load to endpoint (SIP UA) rather than having the resource-usage load be centralized at the B2BUA. Embodiments may have more simple controlling proxies in the sequence vector if necessary, since proxies are more scalable than a B2BUA.

(d) Development of features may be more rapid since the proxy is simpler to modify than a B2BUA in the core.

(e) A proxy does not break peer-to-peer SIP signaling when using the approach of a basic proxy at an endpoint (SIP UA).

(f) The number of B2B applications in sequence may be reduced, thus reducing any slowdown in call transmission to an endpoint (SIP UA) because sequencing through a proxy is faster than sequencing through a B2BUA.

(g) New features can be provided by tapping into endpoint (SIP UA) capabilities and arming an action when a condition is met based on the newer capabilities (e.g., if media content matches a phoneme).

(h) Extending complex rules can be avoided, i.e., avoid extending to new features rules that are intended to ensure that back-to-back UA are well behaved for in-sequence applications. For example, when transferring a call, having an endpoint (SIP UA) execute the transfer operation when a condition is met is much less complex than having an in-sequence application executing the transfer operation. In another example, a recording application to record calls is simpler when implemented by an endpoint (SIP UA) rather than by a B2BUA.

(i) Tracing call-flows and detecting breakages during design and deployment can be simpler when there are no B2B call-flows and when the terminal is armed using standard OOD refer messages, expressing action using a regular RFC3261 request URI, with an endpoint (SIP UA) executing the action.

(j) Creating a core application merely to intercept and execute the call-flow can be avoided, because an endpoint (SIP UA) would intercept and execute the call-flow as the endpoint (SIP UA) would with any other UA operation.

Embodiments of the present invention include a system having one or more processing units coupled to one or more memories. The one or more memories may be configured to store software that, when executed by the one or more processing unit, allows processing of SIP directives by armed rich endpoint (SIP UA)s in a peer-to-peer network, at least by use of processes described herein, including at least in FIGS. 3-4, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A method to perform a directive by a first SIP User Agent (UA) engaged in a peer-to-peer communication session with a second SIP User Agent (UA), comprising:
    arming the first SIP User Agent (UA) to define the directive;
    setting a trigger condition in the first SIP User Agent (UA) to perform the directive if the trigger condition becomes true;
    monitoring, by use of a processor within the first SIP User Agent (UA), for the trigger condition in the communication session; and
    if the trigger condition becomes true, performing by use of a processor the directive without usage of a back-to-back user agent.

2. The method of claim 1, wherein the steps of arming the first SIP User Agent (UA) and setting the trigger condition are by use of one or more out-of-dialog REFER messages.

3. The method of claim 1, wherein the trigger condition comprises a signaling condition.

4. The method of claim 3, wherein the signaling condition comprises one or more of setting up a call, tearing down a call and detection of a user command.

5. The method of claim 3, wherein the signaling condition comprises detection of a predetermined SIP command.

6. The method of claim 1, wherein the trigger condition comprises a billing condition.

7. The method of claim 1, wherein the trigger condition comprises a time-based criterion.

8. The method of claim 1, wherein the trigger condition comprises a characteristic of a media content of the communication session.

9. The method of claim 1, wherein performing the directive comprises the step of invoking a SIP URL.

10. The method of claim 1, wherein performing the directive comprises making at most one referral.

11. The method of claim 1, wherein performing the directive comprises a step selected from a group of steps consisting of changing call state and creating one or more new calls.

12. The method of claim 1, wherein performing the directive comprises assigning a lower priority to a second referral.

13. The method of claim 1, further comprising the steps of:
    monitoring, by first SIP User Agent (UA), a plurality of directives for a trigger condition; and
    resolving, by the first SIP User Agent (UA), conflicts among the plurality of directives.

14. The method of claim 1, wherein performing the directive comprises preserving media content and media connection information.

15. A system to perform a directive by a first SIP User Agent (UA) engaged in a peer-to-peer communication session with a second SIP User Agent (UA), comprising:
    an arming module configured to arm the first SIP User Agent (UA) to define the directive;
    a trigger, in the first SIP User Agent (UA), configured to perform the directive if a trigger condition becomes true;
    a monitor configured to monitor for the trigger condition in the communication session; and
    if the trigger condition becomes true, a processor configured to perform the directive without usage of a back-to-back user agent.

16. The system of claim 15, wherein the arming module and trigger are configured to communicate via one or more out-of-dialog REFER messages.

17. The system of claim 15, wherein the trigger condition comprises a signaling condition.

18. The system of claim 15, wherein the trigger condition comprises a billing condition.

19. The system of claim 15, wherein the trigger condition comprises a time-based criterion.

20. The system of claim 15, wherein the trigger condition comprises a characteristic of a media content of the communication session.

21. The system of claim 15, wherein the directive comprises at most one referral.

22. The system of claim 15, wherein the directive comprises assigning a lower priority to a second referral.

23. The system of claim 15, wherein the directive comprises preserving media content and media connection information.

* * * * *